US006215730B1

(12) United States Patent
Pinto

(10) Patent No.: US 6,215,730 B1
(45) Date of Patent: Apr. 10, 2001

(54) SIDE SCAN SONAR WITH SYNTHETIC ANTENNA

(75) Inventor: Marc Pinto, Brest (FR)

(73) Assignee: Thomson Marconi Sonar S.A.S, Sophia Antipolis (FR)

( * ) Notice: Subject to any disclaimer, the term of this patent is extended or adjusted under 35 U.S.C. 154(b) by 0 days.

(21) Appl. No.: 09/319,694

(22) PCT Filed: Dec. 5, 1997

(86) PCT No.: PCT/FR97/02220

§ 371 Date: Jun. 10, 1999

§ 102(e) Date: Jun. 10, 1999

(87) PCT Pub. No.: WO98/26310

PCT Pub. Date: Jun. 18, 1998

(30) Foreign Application Priority Data

Dec. 10, 1996 (FR) .................................................. 96 15157

(51) Int. Cl.[7] .................................................... G01S 15/89
(52) U.S. Cl. ............................................................ 367/88
(58) Field of Search ...................................... 367/88, 11, 7

(56) References Cited

U.S. PATENT DOCUMENTS

| 4,510,586 | * | 4/1985 | Grall et al. | 367/87 |
| 4,596,007 | * | 6/1986 | Grall et al. | 367/92 |
| 5,295,118 | * | 3/1994 | Gilmour | 367/88 |
| 5,412,617 | * | 5/1995 | Morimatsu et al. | 367/88 |

* cited by examiner

*Primary Examiner*—Daniel T. Pihulic
(74) *Attorney, Agent, or Firm*—Oblon, Spivak, McClelland, Maier & Neustadt, P.C.

(57) ABSTRACT

A synthetic-antenna side sonar device. Two transmission transducers which operate in interferrometric mode are fixed to the two ends of a physical antenna of a sonar. The forward speed of the sonar is chosen so that the zeros of the physical reception antenna coincide with one out of two of the side lobes of the radiation diagram of the synthetic antenna. Also the speed is chosen so that the zeros of the physical diagram of the interferrometric transmission antenna coincide with the other side lobes. This arrangement increases the range and thus the hourly coverage of a sonar for a given speed.

20 Claims, 2 Drawing Sheets

CONVENTIONAL ANTENNA

INTERFEROMETRIC ANTENNA: DOUBLE SPEED

SYNTHETIC LOBE

PHYSICAL RECEPTION LOBE

PHYSICAL TRANSMISSION LOBE

SIDE SCAN SONAR WITH SYNTHETIC ANTENNA

BACKGROUND OF THE INVENTION

1. Field of the Invention

The present invention relates to synthetic-antenna side sonars which make it possible to obtain a sonar image by scanning through water abeam of a boat which is carrying or towing the sonar, and by using the echoes of the signals transmitted by a transmission antenna such as the antenna 101 in FIG. 1 for a plurality of successive positions of the boat.

2. Discussion of the Background

Synthetic-antennas are known in which a virtual antenna is formed from the N different spatial positions of a physical antenna such as the antenna 102 in FIG. 1. The role of the physical antenna is, on the one hand, to ensure sufficient rejection of the array lobes of the physical antenna by placing them in the directionality zeros of the physical antenna (first condition) and, on the other hand, to ensure a sufficient directionality gain in the direction of the focal point for N successive integrated recurrences (second condition).

It will be noted that the antenna 101 may or may not form part of the physical antenna 102.

The first condition requires an angular directionality of the physical antenna at least equal to the angular period of the array lobes. This is equal to $$\frac{\lambda}{2vT},$$

where T is the inter-recurrence period, $\lambda$ the transmission wavelength and v the speed of the boat carrying the sonar. This leads to the well-known sampling condition:

$$\frac{\lambda}{L} \leq \frac{\lambda}{2vT} \Rightarrow L \geq 2vT \quad (1)$$

Since the inter-recurrence period T is fixed by the maximum range of the sonar, (1) limits the product of the speed times the maximum range, that is to say the hourly coverage of the synthetic-antenna sonar.

The second condition fixes the maximum value of N, and therefore the resolution of the synthetic-antenna sonar.

Thus, in the simple case in which the directionalities on transmission and on reception for the physical antenna are identical and equal to:

$$D_e(u) = D_r(u) = \mathrm{sinc}\left(\frac{L}{\lambda}u\right) \quad (2)$$

with $u = \sin\theta$ where $\theta$ is the bearing and with the definition $$\mathrm{sinc}(u) = \frac{\sin(\pi u)}{(\pi u)},$$

the length of the synthetic antenna is limited to:

$$L_s = \frac{\lambda}{L}\rho \quad (3)$$

where $\rho$ is the range of the sonar.

The side resolution is then given by the conventional formula:

$$\frac{\lambda}{2L_s}\rho = \frac{L}{2} \quad (4)$$

When the physical antenna is itself an array, which is very frequent in sonar, the directionalities on transmission and on reception are no longer necessarily identical.

It is, for example, possible to broaden the transmission sector by transmitting with a restricted portion 101, of length $L_e$, of the physical antenna 102, and to form a set of physical reception channels in this sector.

When the synthetic antenna is formed with a physical reception channel of fixed aiming direction, cutting out a given subsector of this broadened transmission sector, a so-called "isingle beam" synthetic-antenna sonar is obtained whose properties are essentially equivalent to the simple synthetic antenna described above, for which the directionalities on transmission and on reception are equal. In particular, its side resolution is again given by (4).

By cutting the transmission sector up into different subsectors corresponding to a set of physical reception channels, it is possible to form simultaneously a plurality of single-beam synthetic antennas which can then be integrated incoherently. A so-called "incoherent multibeam" synthetic antenna is then obtained. This antenna has the same side resolution as the single-beam synthetic antennas of which it is formed, but the incoherent addition makes it possible to reduce the variance of the reverberation and to improve the radiometric resolution of the image.

Coherent addition of these single-beam synthetic antennas leads to the so-called "coherent multibeam" synthetic antenna, which makes it possible to increase the length of the synthetic antenna to:

$$L_s = \frac{\lambda}{L_e}\rho \quad (5)$$

and consequently the side resolution to $$\frac{L_e}{2}.$$

All these operating modes, which are well known, make it possible to obtain improved images compared with the simple mode, but in no way alter the first constraint (1) which must still be satisfied. However, this constraint is very severe in practice, in particular for medium-range bed imaging systems (typically 3000 m for the TOBI system from SOC [Southampton Oceanographic Centre, United Kingdom]) for which it might be desired to reduce the side resolution (this is about 50 m at 3000 m for TOBI) by synthetic aperture. Thus, for physical antenna lengths of respectively L=3 m, L=4 m or L=5 m, this first constraint limits the maximum range to only 1125 m, 1500 m or 1800 m, even when operating at the slow speed of v=1 m/s typical of towed sonars in deep water.

It is therefore desirable to be able to increase, for example to double, the maximum range of the synthetic antenna in comparison with that given by (1), even at the cost of increasing, for example doubling, the side resolution compared with (4). With an antenna such that L=4 m, bed imaging systems ranging to 3000 m with a side resolution of 4 m could be obtained. In the prior art as it now stands, it is known that the side resolution for L=4 m is 2 m for the simple operating mode and may be reduced further, if so desired, by employing the coherent multibeam mode, but extending the range up to 3000 m requires a physical antenna of length L=8 m regardless of the mode adopted, which is impossible to reconcile with normal bulk constraints.

It is also desirable to be able to increase the speed for a given range.

A sonar system known by the name of interferometric transmission sonar is furthermore known [1] from a French Patent No. 2 412 177 filed by the company THOMSON-CSF, having G. GRALL as its inventor, in which acoustic signals are simultaneously transmitted at the two ends of the reception antenna. However, this sonar system is not used to form a synthetic antenna.

U.S. Pat. No. 5,295,118 [2] granted on Mar. 15, 1994 to Westinghouse Elec. Corp. under the rights of G. A. GILMOUR is also known, which describes a sonar which itself also uses two transmitters lying at the two ends of the antenna, but transmitting alternately (alternation on each recurrence) in two distinct spectral bands. According to the author, alternate transmission makes it possible to double the hourly coverage compared with (1) without loss of performance. In fact, this is not at all true. Each spectral component of the synthetic antenna is undersampled by a factor of two, and the same is true for the total synthetic antenna. The loss of performance is therefore identical to that of the conventional method, with fixed transmission throughout the spectral band, when (1) is no longer satisfied.

SUMMARY OF THE INVENTION

In order to obtain the desired increase in range, the invention proposes a synthetic-antenna side sonar including a physical antenna of length L for obtaining, as a function of the speed of longitudinal movement of this antenna, a synthetic radiation diagram having a central lobe and a set of side lobes regularly spaced on each side of this central lobe, and a first physical radiation diagram having a first set of zeros lying, taking the speed of movement into account, on certain of the side lobes, and at least one first transducer, principally characterized in that it furthermore includes at least one second transducer, these two tranducers making it possible to obtain a second, interferential physical radiation diagram having a second set of zeros lying on the other of the side lobes which are not covered by the first set of zeros, taking into account the speed. The side lobes and the two sets of zeros above are shifted identically with the frequency, which permits wideband operation.

According to another characteristic, the physical antenna is used in reception and the first and second transducers are used in transmission.

According to another characteristic, the sets of zeros are distributed over the sets of side lobes so as to obtain a multibeam synthetic antenna.

According to another characteristic, the physical antenna is used in transmission and the two transducers are used in reception.

According to another characteristic, a part of the physical antenna is used to form a subantenna including the two transducers lying at the ends of this portion.

According to another characteristic, it includes means allowing auxiliary transmissions to be made in order to perform autofocusing.

BRIEF DESCRIPTION OF THE DRAWINGS

Other features and advantages of the present invention will become more clearly apparent on reading the detailed description and the appended figures, in which.

DETAILED DESCRIPTION OF THE PREFERRED EMBODIMENTS

Figure 1:
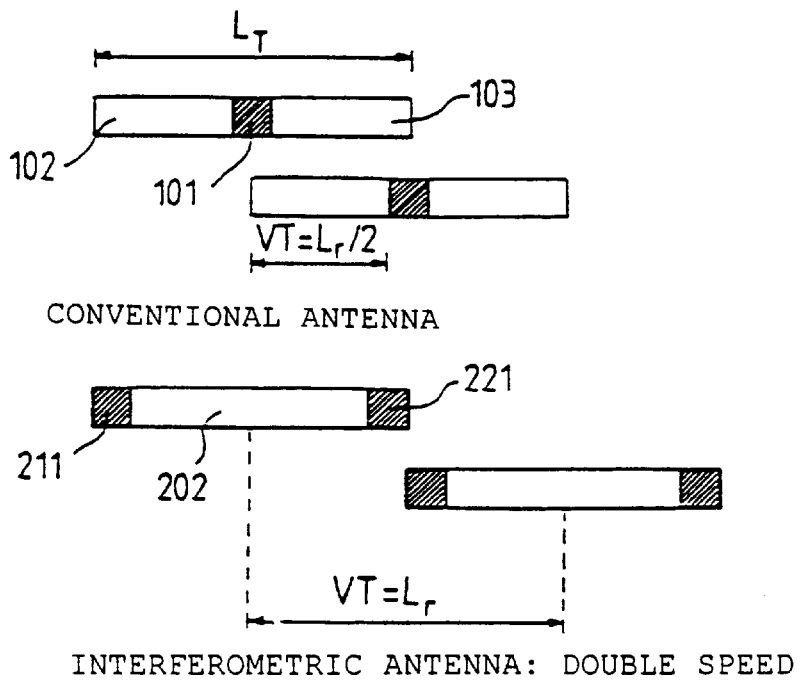
FIG. 1 represents a comparative view of a conventional antenna and an antenna according to the invention, which are represented in two successive positions corresponding to the same time interval.

According to the invention, as represented in FIG. 1, two distinct transmitters 211 and 221 are used which lie at the two ends of the physical antenna 202 of a synthetic-antenna side sonar for simultaneously transmitting pulses of central frequency $f_o$ and of bandwidth B.

Analysing the physical transmission and reception lobes at an arbitrary frequency in the spectrum makes it possible to assess the results provided by this modification.

In order to see the contribution of the interferometric transmission, let us analyse the physical transmission lobes. The only modification is to the transmission lobe, which becomes:

$$D_e(u) = \mathrm{sinc}\left(\frac{L_e}{\lambda}u\right)\cos\left(\pi\frac{L}{\lambda}u\right) \qquad (7)$$

where $L_e \ll L$ is the dimension of an individual transmitter.

Figure 2:
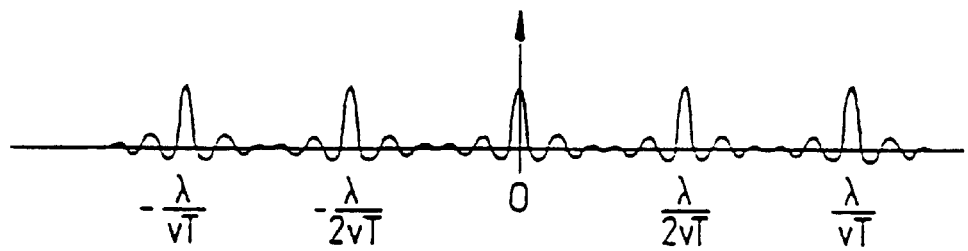
FIG. 2 represents a diagram of the transmission and reception lobes of a sonar according to the invention.
Figure 2:
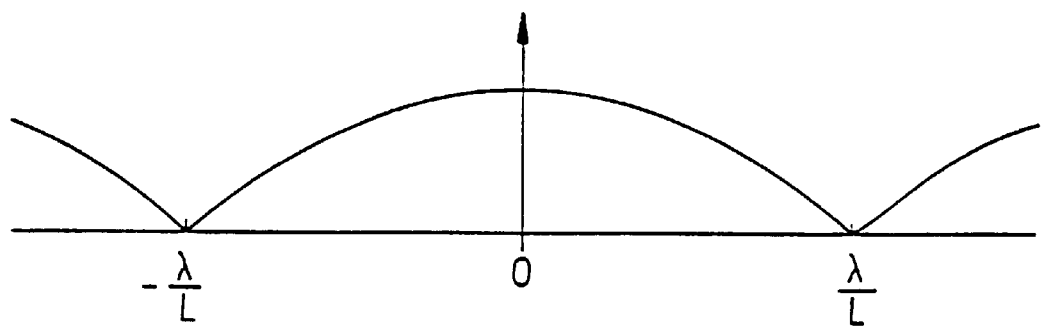
Figure 2:
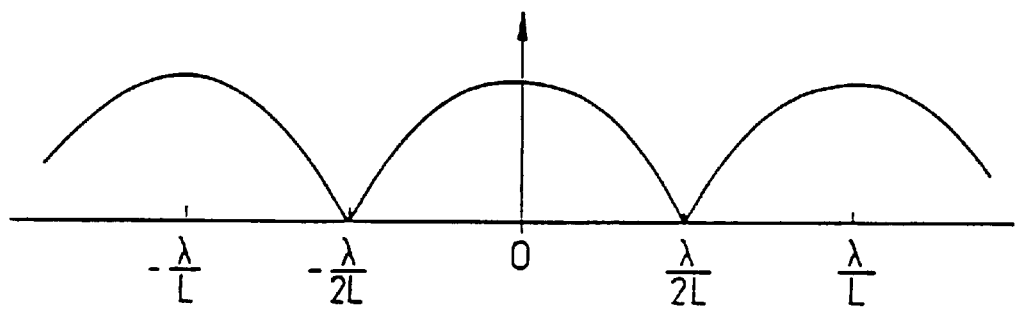

This lobe is represented in FIG. 2, where it can be seen that, unlike in conventional transmission, it has directionality zeros in the directions $$(2m+1)\frac{\lambda}{2L}.$$

This provides an additional possibility for cancelling the array lobes of the synthetic antenna, which are themselves also represented in FIG. 2. They may be cancelled by the physical reception lobe, itself also represented in FIG. 2, which takes the on conventional form (2), in the directions $$2m\frac{\lambda}{2L},$$

but also by the physical transmission lobes as can be seen in FIG. 2.

More precisely, the transmission/reception product is given by the product of (7) and (2), i.e.:

$$D_e(u)D_r(u) = \mathrm{sinc}\left(\frac{L_e}{\lambda}u\right)\cos\left(\pi\frac{L}{\lambda}u\right)\mathrm{sinc}\left(\frac{L}{\lambda}u\right) = \mathrm{sinc}\left(\frac{L_e}{\lambda}u\right)\mathrm{sinc}\left(\frac{2L}{\lambda}u\right) \qquad (8)$$

The last term is identical to the conventional directionality lobe of a physical antenna of double length 2L. The result of this is that the properties of the interferometric-transmission synthetic antenna are at any point equivalent to those of a physical antenna of double length operating in single-beam mode, the reception channel being aimed along the axis of the antenna.

In particular, the sampling condition can be written:

$$2L \geq 2vT \text{ i.e. } L \geq vT \qquad (9)$$

The result of this is therefore a doubling of the hourly coverage proportional to VT, as explained in FIG. 1, in comparison with the condition (1). As for the length of the synthetic antenna, it has the value:

$$L_s = \frac{\lambda}{2L}\rho \qquad (10)$$

which corresponds to a side resolution of:

$$\frac{2L}{2} = L \qquad (11)$$

that is to say twice that given by (4).

Figure 3:
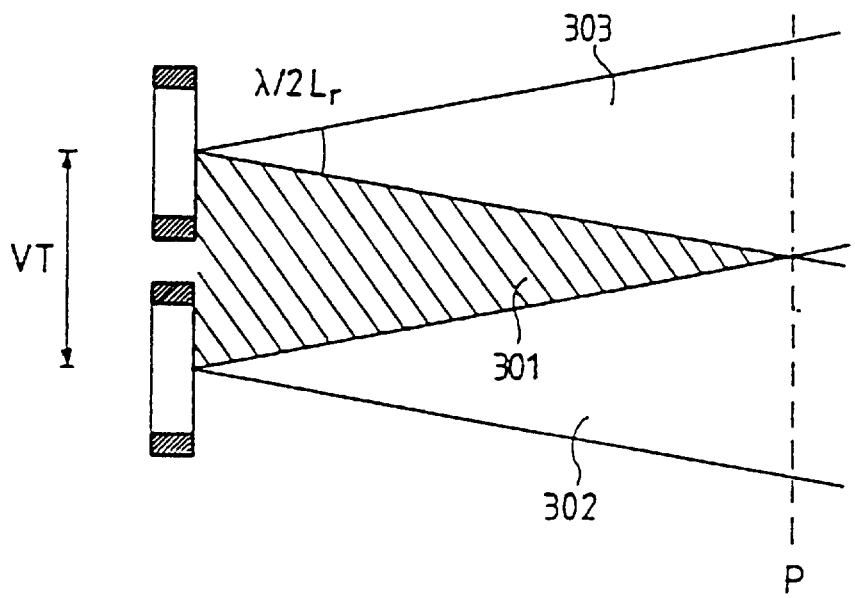
FIG. 3 represents a schematic view of the coverage zone of an antenna according to the invention.

However, in order to operate without coverage holes in side view, it is necessary to be situated in the overlap zone of the individual coverages 302 and 303, and therefore beyond the distance ρ which limits this blind zone 301 represented by hatching in FIG. 3, thus making the following additional condition necessary:

$$vT \leq \frac{\lambda}{2L}\rho \qquad (12)$$

i.e., in view of (9):

$$\rho \geq \frac{2L^2}{\lambda} = 2L_f \qquad (13)$$

The range must therefore exceed $2L_f$ and this condition is most often satisfied for side sonars which still have a blind zone at the start of their range.

It can therefore be seen that the resolution of the interferometric-transmission synthetic antenna is still at least two times better than that of the physical reception antenna of length L because, according to (13), the operation is carried out at least at twice the Fresnel distance of the latter antenna (at the Fresnel distance, the side resolution of the physical antenna is equal to is length).

The invention also applies to multibeam synthetic antennas. This is because the identity used above between the transmission/reception product of the physical antenna with interferometric transmission and conventional reception (in single-beam mode aimed along the axis) and the same product for a physical antenna in conventional transmission and conventional reception with an antenna of double length (also in single-beam mode aimed along the axis) is directly applicable to all the aiming directions of the physical reception antenna which coincide with a local maximum in the transmission (7) and for which:

$$u_{2m} = 2m\frac{\lambda}{2L} \qquad (14)$$

These local maxima correspond to the directions of the points F such that:

$$E_1F - E_2F = m\lambda \qquad (15)$$

where $E_1$ and $E_2$ are the phase centres of the two transmitters of the interferometric transmission.

The invention therefore applies to the simultaneous formation of M synthetic antennas with interferometric transmission and single-beam reception in directions given by (14). The M synthetic antennas with interferometric transmission can then be integrated incoherently in order to improve by $\sqrt{M}$ the radiometric resolution. Coherent integration is not beneficial because it leads to a synthetic antenna with gaps.

The invention can also be implemented by permuting the respective roles of transmission and reception in comparison with the system described above. Conventional transmission of the form (2), and interferometric reception on two transducers at the two ends of the antenna, are then used. The directionality lobe in reception is then given by (7). Since the transmission/reception product of this system is also given by (8), all the properties which are derived therefrom, and in particular (9) and (11), are identical.

Under these conditions, and in order to use nomenclature common to these two operating modes, these devices will be denoted by the name "interferometric-transduction synthetic antennas".

As an illustrative embodiment, mention will be made of a medium-range bed imaging system including a single-beam interferometric-transduction synthetic antenna (it being equally possible for the interferometry to be carried out on transmission or on reception) or an incoherent multibeam one operating at a central frequency of 30 kHz, with a physical antenna length of 4 m and moving at a speed of 1 m/s. This sonar operates from 640 m ($2L_f$) to 3000 m and permits a side resolution of 4 m.

The invention may be combined with a plurality of transmissions which are referred to as auxiliary because they are carried out in spectral bands separate from that of the main transmissions used for the imaging. French Patent Application [4] No. 95 10953 filed by the company THOMSON-CSF on Sep. 19, 1995 describes a method for producing such auxiliary transmissions, and this can therefore be combined with the present invention with a view to making it easier to compensate for spurious effects due to the motion of the carrier and to the fluctuations of the medium.

In this French Patent Application No. 95 10953, the applicant company also described a method for autofocusing a conventional synthetic-antenna sonar using two auxiliary transmitters whose phase centres are spaced apart as much as possible, and therefore by more than L. These auxiliary transmissions are carried out in spectral sub-bands separate from that used for the imaging and are furthermore separate from one another, which makes it possible to split the three transmissions by suitable filtering in reception. It is then shown that there is still, for a given pair of recurrences, an auxiliary spectral sub-band for which the nominal motion of the phase centre of the sonar (middle geometrical locus of the phase centre of the auxiliary transmitter in question and the physical reception antenna) is zero. This is because the alternation of the auxiliary transmissions makes it possible to synthesize a side motion of the transmission by L, which will exactly compensate for the nominal motion by $$vT = \frac{L}{2}$$

of the carrier. A strong correlation of the received signals for two consecutive recurrences is then obtained, which makes it easier to estimate the parameters needed for the focusing.

According to an alternative embodiment, this autofocusing method is combined with the method of the present invention. The fact that movement is taking place twice as fast for the interferometric-transduction synthetic antenna than for the conventional synthetic antenna entails modification to the previous embodiment. In order to compensate by an opposite movement on transmission for the side motion of the carrier, nominally vT=L i.e. double the previous one, it would be necessary for the auxiliary transmitters to be separated by 2L, even though the maximum separation is, as has been seen, equal to L. This compensation is therefore carried out by superposing an additional motion of amplitude L on reception with the motion of amplitude L by the auxiliary transmitter. To that end, a subset of M transducers is chosen in reception from among the P of the physical reception antenna, and this subset is moved electronically by P-M transducers in the opposite direction to the motion of the carrier, as described in French Patent No. 2 675 587 [5] granted on Oct. 23, 1992 in the name of THOMSON-CSF, where this technique is used for a very different purpose. Movement on reception close to L is thus synthesized by choosing M=1 and by reducing the spacing between the transducers in order to synthesize an almost point-like sub-antenna.

The autofocusing method known from patent application [4] does, however, apply increasingly well as the sub-antenna becomes larger. Thus, according to one variant, the nominal side motion of the carrier vT is reduced to a quantity D strictly smaller than L, the principle of the interferometric transduction remaining applicable in this case. To that end, a portion reduced in the ratio $$\frac{D}{L}$$

of the physical reception antenna is used for the interferometric transduction itself. In other words, the autofocusing method is used with a sub-antenna of size 2(L–vT), and the hourly coverage gain permitted by the interferometric transduction is equal to $$2\frac{D}{L}$$

(for D=L, the factor 2 is recovered).

In the case of producing an interferometric synthetic antenna on transmission, the auxiliary transmitters and the main transmitters may be merged in order to reduce the total number of transmitters needed. Combining the main and auxiliary transmissions above then leads to simultaneously transmitting different codes at the two ends of the interferometric transmission base, the codes transmitted by a given transmitter also being variable from one recurrence to the next. These differences in choice are unimportant for the imaging itself: this is because after filtering in the main sub-band, the transmitted codes are identical, which is not the case with the method described in the patent [2] cited above.

What is claimed is:

1. A synthetic-antenna side sonar comprising:
   at least one first transducer and a physical antenna of length L configured to obtain, as a function of a speed of longitudinal movement of the physical antenna, a synthetic radiation diagram having a central lobe and a set of side lobes regularly spaced on each side of the central lobe, and a first physical radiation diagram having a first set of zeros lying, taking the speed of longitudinal movement into account, on certain of the side lobes;
   at least one second transducer which, in combination with the first transducer, is configured to obtain, as a function of the speed of longitudinal movement, a second, interferential physical radiation diagram having a second set of zeros lying on the side lobes which are not covered by the first set of zeros.

2. A sonar according to claim 1, wherein the speed of longitudinal movement is chosen so that the zeros of the first set lie on the side lobes of even rank and the zeros of the second set lie on the side lobes of odd rank.

3. A sonar according to claim 1, wherein the physical antenna is used in reception and the first and second transducers are used in transmission.

4. A sonar according to claim 3, wherein the first and second sets of zeros are distributed over the sets of side lobes so as to obtain a multibeam synthetic antenna.

5. A sonar according to claim 1, wherein the physical antenna is used in transmission and the first and second transducers are used in reception.

6. A sonar according to claim 1, wherein part of the physical antenna is used to form a subantenna including the first and second transducers, and wherein the first and second transducers are positioned at ends of the selected part of the physical antenna.

7. A sonar according to claim 1, further comprising means for allowing auxiliary transmissions to be made in order to perform autofocusing.

8. A sonar according to claim 7, further comprising means for choosing, from the first and second transducers of the antenna, a subset of transducers, and means for electronically moving the subset of transducers in an opposite direction to motion of a carrier of transducers other than in the subset.

9. A sonar according to claim 7, wherein a nominal side motion of a carrier of the first and second transducers is reduced to a quantity D less than L, and interferometric transduction is performed only for a portion of the physical antenna reduced for the ratio D/L is used.

10. A sonar according to claim 7, wherein common of the first and second transducers are used to make the auxiliary and main transmissions, and in that the transmissions are separated by using distinct codes.

11. A sonar according to claim 2, wherein the physical antenna is used in reception and the first and second transducers are used in transmission.

12. A sonar according to claim 2, wherein a part of the physical antenna is used to form a subantenna including the first and second transducers, and wherein the first and second transducers are positioned at ends of the part of the physical antenna.

13. A sonar according to claim 3, wherein a part of the physical antenna is used to form a subantenna including the first and second transducers, and wherein the first and second transducers are positioned at ends of the part of the physical antenna.

14. A sonar according to claim 4, wherein a part of the physical antenna is used to form a subantenna including the first and second transducers, and wherein the first and second transducers are positioned at ends of the part of the physical antenna.

15. A sonar according to claim 5, wherein a part of the physical antenna is used to form a subantenna including the first and second transducers, and wherein the first and second transducers are positioned at ends of the part of the physical antenna.

16. A sonar according to claim 2, further comprising means for allowing auxiliary transmissions to be made in order to perform autofocusing.

17. A sonar according to claim 3, further comprising means for allowing auxiliary transmissions to be made in order to perform autofocusing.

18. A sonar according to claim 4, further comprising means for allowing auxiliary transmissions to be made in order to perform autofocusing.

19. A sonar according to claim 5, further comprising means for allowing auxiliary transmissions to be made in order to perform autofocusing.

20. A sonar according to claim 6, further comprising means for allowing auxiliary transmissions to be made in order to perform autofocusing.

* * * * *